April 20, 1965  H. J. HEBERT ETAL  3,178,764
LIVEBOX WITH FISH SCALING MEANS THEREIN
Filed March 29, 1963

Herman J. Hebert
John B. Edgar
INVENTORS

BY *[signatures]*
Attorneys

3,178,764
LIVEBOX WITH FISH SCALING MEANS THEREIN

Herman J. Hebert, Baton Rouge, La., and John B. Edgar, 6119 Glenwood Drive, Baton Rouge, La.; said Hebert assignor to said Edgar
Filed Mar. 29, 1963, Ser. No. 268,867
8 Claims. (Cl. 17—5)

The present invention relates to a livebox for fish which is unusual and consequently novel in that it is such in construction that it has the additional function of a live fish scaler.

A general object of this invention is to provide a simple, practical and economical livebox which functions to confine and keep caught fish alive while the user is conveniently permitted to fish from a boat, usually a powered boat, and wherein the construction of the livebox is such that it can be attached by way of a towline or trolling line to the trailing end of the powered boat whereby the fish confined therein will be scaled. This scaling step can be satisfactorily resorted to during the fisherman's return trip to the takeoff landing, or for that matter, while the boat is being employed on a short trip traveling, for instance, between desirable fishing spots.

When being used as a livebox a relatively short cord or a line of suitable strength is attached to a bail on one end of the livebox whereupon it can be tied to the side of the boat then immersed in the water, the confined fish being available through the medium of a hinged trap door at the then-existing upper end of the livebox.

Briefly the invention comprises a cylindrical container which is constructed from a suitable grade and mesh of hardware cloth (or equivalent material as will be hereinafter explained). One end of the container embodies a generally flat disk-like portion which is provided with an appropriate closure which permits access to be had to the interior. The other end is of conical construction, the cone portion embodying circumferentially spaced forwardly converging vanes or blades. These blades are of triangular construction and have adjacent lengthwise edges spaced apart but slightly overlapped thus providing knife-like scaling edges. The blades thus oriented provide water passing and scaling members and simultaneously cooperate in a manner which transforms the cone into an impeller. The impeller rotates the container in a manner that the contained live fish are subjected to a scaling step as the device is towed (swiftly as a general rule) by the powered boat and towline.

More specifically, an elongated cylinder made of hardware cloth, perforated steel, expanded metal, heavy nylon cloth, plastic fiber, moldable plastic material or a combination of such materials defines not only the body and container but a fish scaler, too. As suggested, one end is normally closed by an appropriate hinged door or latch-held lid. The opposite axially aligned end embodies a sheet material conical rotor having double purpose impelling and scaling vanes or blades.

As will be hereinafter more fully appreciated one feature of the invention resides in a simple screen-type cylindrical livebox with suitably constructed opposite ends constituting and providing a novel fish scaler wherein the same is self-agitated and maneuvered in a manner that it oscillates, rotates, bobs and weaves and is otherwise activated without requiring self-contained power means.

The invention also features a special sheet material collar which rigidifies the forward or leading end of the screen cylinder, which provides a satisfactory mount for the blades which go to make up the impeller cone and which is provided at the forward end with an outstanding endless flange which constitutes a baffle and imparts an active but indeterminate motion as the device is towed behind the fishing boat by way of a tow rope, chain or the like.

The purpose of the invention is twofold. It serves as a livebox for keeping the catch (fish caught) alive until the fisherman is ready to return to the landing and without removing them from the container he simply pulls the container back of his boat and the container scales the fish for him and washes the scales and slime in the water.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
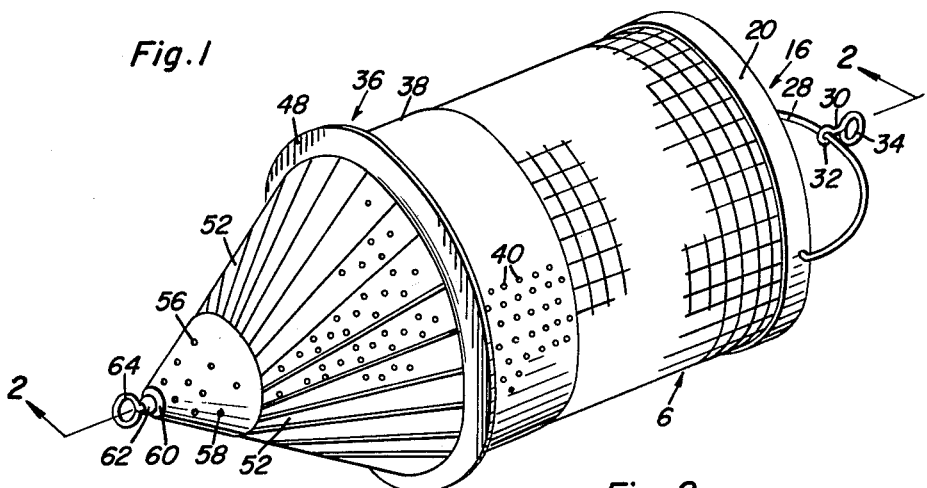
FIGURE 1 is a view in perspective of a combination livebox and fish scaler constructed in accordance with the invention and showing the manner in which it is constructed and readied for use.
Figure 2:
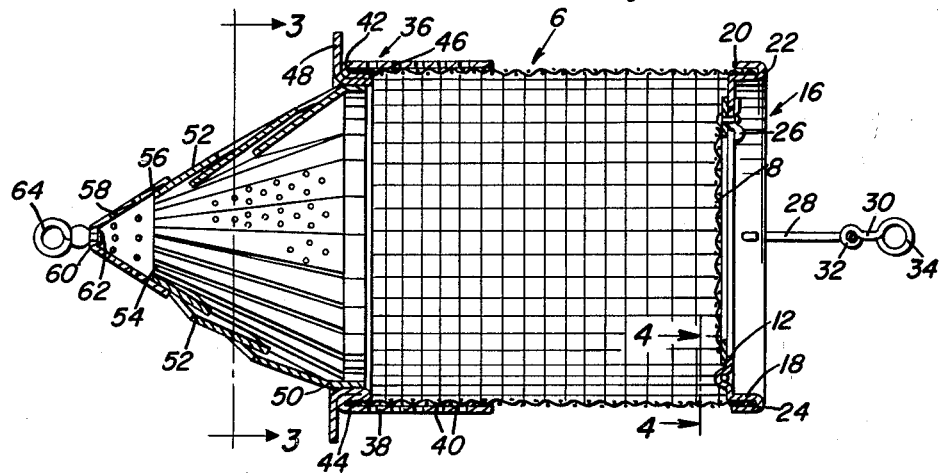
FIGURE 2 is a view in section and elevation taken on the plane of the longitudinal section line 2—2 of FIGURE 1, looking in the direction of the indicating arrows.
Figure 3:
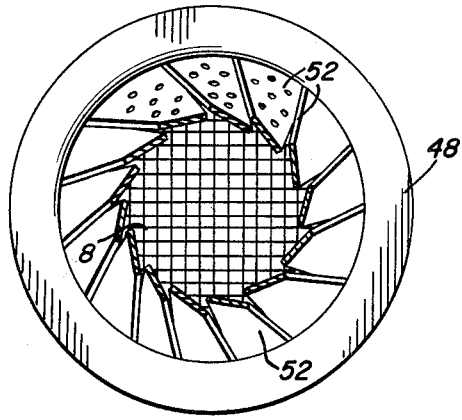
FIGURE 3 is a cross-section taken on the vertical section line 3—3 of FIGURE 2.
Figure 4:
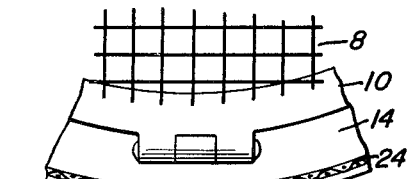
FIGURE 4 is an enlarged detail section taken on the plane of the section line 4—4 of FIGURE 2.

Referring now to the views of the drawing it will be observed that the body portion of the device comprises a hollow container 6 which, more specifically, may be described as either an open-ended cylinder or drum, more particularly, one which is made from rigid screen wire (hardware cloth, perforated sheet steel, expanded sheet metal, an appropriate grade of perforated nylon cloth, or moldable plastic material appropriately perforated) which generally speaking may be classified as an appropriate screen. The mesh of the screen or equivalent material must be suitably porous in character that the edges of the pores or apertures constitute scaling members. The edges or surfaces which go to make up the scaling media should not be so sharp that they would undesirably gash and cut the skin or flesh of the fish after the scales have been loosened and removed. It is realized that generally speaking the skin under the scales of the average fish is fairly tough and is consequently not likely to fail to withstand the scaling treatment to which the captive fish are subjected.

One end of the cylinder is provided with closure means comprising a screen or an equivalent foraminous lid or cover 8 which is generally disk-like in form and is provided with a ring-like frame 10. This frame encircles an entrance opening 12 defined or provided by a sheet metal or an equivalent annulus 14. The annulus is an integral part of a channel-shaped mounting and attaching member 16. This member 16 comprises a suitable binder which is channel-shaped in cross-section to provide inner and outer annular members 18 and 20 joined by a connecting web 22, the channel serving to accommodate the cooperating terminal end portion 24 of the screen cylinder. Thus this channel member 16 provided with an annulus 14 and said annulus equipped with a door or lid 8 provides a satisfactory closure for the righthand end of the cylinder. A pivoted manually actuatable latch or catch is provided as at 26 to keep the door normally closed. The means 16 also serves to support a pivoted wire bail or handle 28 which is provided with a link 30 having an attaching eye 32 at one end connected with the bail and having a larger eye 34 at the other end to which a suspension cord, line or the like (not shown) is connected when the device is used as a livebox and, as is generally the case, is suspended over the side of the boat while fishing.

The closure means for the opposite end of the cylinder is quite novel in that it serves not only as a closure but also as an impeller and, in addition, a scaling means. This device is preferably constructed to provide approximately three component parts, the first one of which may be identified as a collar 36. The latter embodies a non-corrodible ring-like band 38 which snugly surrounds the exterior forward end portion of the screen cylinder and is suitably perforated as at 40. The forward end portion of the collar is bent upon itself to provide an endless channel 42 for reception and retention of the lip 44 of the screen and a portion which is doubled upon itself as at 46 to provide a reentrant ring-like bent portion. The remaining terminal portion of the sheet material is then fashioned into an endless outstanding flange 48 which constitutes a wabble-type baffle. The reentrant portion 46 permits the coacting end portions 50 of the forwardly converging vanes or blades 52 to be welded or otherwise connected thereto. These vanes are generally triangular in plan or shape as shown in FIG. 1 and the wider ends are attached to the collar means 36 and the narrower ends 54 are welded within and attached to a truncated conical cap 56 which is highly perforated as at 58. The flattened truncated end 60 is provided with a swivel 62 carrying a complemental eye 64 to which a towline or chain (not shown) is attached, that is, when the device is converted from a boat suspended live-box to a traveling agitated fish scaler. The vanes or blades have their edges slightly overlapped but suitably spaced apart to permit them to cooperate in defining the conical impeller, to serve as scalers and also as satisfactory passages for the water which enters the screen cylinder 6.

It will be obvious that the blades which go to make up the principal part of the conical impeller are disposed at desired coacting angles to cause the activated impeller to impart the desired scaling motion to the overall live box. Experience has shown that a live box of the construction illustrated and described has a tumbling action, rocks back and forth and sideways and bobs in the wake of the fishing boat when the latter is traveling at requisite speed. Further, the conical impeller pilots the device and tends to keep it atop the water being traversed. Not only does the flange 48 contribute to the vigorous action of the scaler, it tends to continually throw the fish about in the box and assures a good scaling and washing result. Consequently and even though the screen 6 is of a fine mesh gauge, the openings are not likely to be clogged up with scales and slime or debris that might find its way into the container portion of the box.

The action of the box also causes the fish to move against each other thereby removing some of the scales. The livebox and scaler may be made in various sizes to accommodate the number and size of the fish to be scaled at one time.

When different species of fish are scaled at the same time the scaler should be pulled in and the soft-scaled fish removed as they will be completely scaled before the hard-scaled fish have been completely scaled. This provides additional surface for scaling action for the tougher-scaled fish. Scaled fish may be removed and placed in an icebox and the livebox immediately used again for an additional catch. It is not necessary to refrigerate fish immediately after scaling unless they are kept for a prolonged period of time, because the fish are kept alive until they are scaled.

The outstanding flange 48 constitutes a wabble-type baffle. The tension of the towline or rope from the boat pulls the container forwardly during which time the fish are washed toward the rear of the scaler and, while they are being thus acted on they are pulled across the rigid screen wire which results in the scales being removed. The bobbing up and down motion of the scaler can be governed by the speed of the motor boat. When the device is used for scaling the point of the cone tends to ride over the water's surface and avoids digging into the surface of the water. The vanes or blades on the cone cause the scaler to turn or rock and this not only forces the blades and rigid screen wire across the fish but also causes the fish to turn so that they are completely scaled.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination live fish box and fish scaler comprising: a foraminous container having end portions each provided with closure means, the closure means at one end being provided with a normally closed readily openable and closable cover, being further provided with a pivotally mounted handling bail, the closure means at the other end embodying fish scaling means, the latter being conical in form and embodying cooperating circumferentially arranged blade-like vanes, the lengthwise edges of said vanes constituting scaling edges.

2. For use by a fisherman, a hollow elongated generally cylindrical fish scaling foraminous body having leading and trailing ends, closure means carried by the said trailing end thereof and including a hingedly mounted openable and closable cover permitting access to be had to the container space in said body, and closure means for the leading end of said body, the last-named closure means comprising a conical member embodying a multiplicity of circumferentially spaced cooperating blades and providing (1) a body turning impeller and (2) fish scaling means, the forward end of said conical closure means embodying a perforated conical cap connected with forward ends of said blades, the apical end of said cap being provided with a swivelly mounted eye and said eye being adapted to permit a towline to be attached thereto in a manner to minimize undesirable twisting of said line.

3. A combination livebox and fish scaling device comprising a cylindrical screen providing a container and having closure means and suspension means at one end permitting said device to be hung over the side of a boat when employed as a simple livebox, a collar embracing the opposite end of said container, said collar being provided with an outstanding flange constituting a baffle, and a conical member attached to and carried by said collar, said conical member embodying forwardly converging circumferentially arranged triangular blade-like members having cooperating lengthwise edges spaced and constituting scaling members, and a swivelly mounted eye cooperatively embodied in the forward end of said conical member and adapted to permit a towline to be attached thereto.

4. For use when fishing, a hollow elongated rigid foraminous fish scaling and confining container adapted to be towed lengthwise behind a boat and having closure means at its trailing end, fish scaling means at its leading end, said scaling means embodying circumferentially arranged cooperating blades, said blades being elongated and having their longitudinal edges spaced apart, and an endless outstanding flange encircling and secured to said leading end of said container, said flange constituting a wabble-type baffle and causing said scaling means to rise to and remain on the water's surface when the container is towed by a towline connected to a moving boat.

5. The structure according to claim 4, and wherein said blades slope from the container into forwardly converging relationship, the forward converging ends being connected to an apertured conical assembling cap, said cap having a swivel for an attachable towline.

6. The structure according to claim 4, and wherein said blades are apertured and also constitute impeller vanes, whereby the scaling means has the additional function of an impeller, the latter serving to rotate the container and also the scaling means.

7. The structure defined in claim 6, and in combination, a ring-like highly perforated band encircling an associatively cooperable end portion of said container and affixed thereto rearwardly of but proximal to said wabble-type baffle.

8. A combination livebox and fish scaling device comprising: a cylindrical screen providing a container and having cooperatively associated closure and suspension means mounted on one end and permitting said device to be hung over the side of a boat when employed as a simple livebox; an endless circular rigid flange completely encircling and secured to the other end of said container, said flange constituting a wabble-type baffle; highly apertured conical closure means joined integrally with said flange; a ring-like band snugly embracing said other end of said container, said band constituting a collar, being joined with said flange, being of an outside diameter less than the outside diameter of said flange and circumferentially apertured; and blade means associatively cooperable with said container for imparting rotation to the same.

References Cited by the Examiner
UNITED STATES PATENTS

| 2,111,959 | 3/38 | Baxter | 43—55 |
| 2,538,853 | 1/51 | Worl | 43—55 |
| 2,990,642 | 7/61 | Bloom et al. | 43—55 |
| 3,036,400 | 5/62 | Anderson | 43—55 |
| 3,095,601 | 7/63 | Wier, Sr. | 17—5 |

SAMUEL KOREN, *Primary Examiner.*

LUCIE H. LAUDENSLAGER, *Examiner.*